United States Patent [19]

Parkes, Jr. et al.

[11] Patent Number: 5,545,970

[45] Date of Patent: Aug. 13, 1996

[54] VOLTAGE REGULATOR CIRCUIT HAVING ADAPTIVE LOOP GAIN

[75] Inventors: John J. Parkes, Jr., Boynton Beach; James G. Mittel, Lake Worth, both of Fla.

[73] Assignee: Motorola, Inc., Schaumburg, Ill.

[21] Appl. No.: 283,330

[22] Filed: Aug. 1, 1994

[51] Int. Cl.$^6$ .................................................. G05F 1/573
[52] U.S. Cl. .......................................... 323/277; 323/273
[58] Field of Search .................................... 323/273, 277, 323/281

[56] References Cited

U.S. PATENT DOCUMENTS

| | | | |
|---|---|---|---|
| 3,597,657 | 8/1971 | Fredricsson | 317/22 |
| 4,355,277 | 10/1982 | Davis | 323/351 |
| 4,899,098 | 2/1990 | Gariboldi | 323/277 |
| 5,041,777 | 8/1991 | Riedger | 323/277 |

OTHER PUBLICATIONS

Statutory Invention Registration No. H1319, T. C. Stroup, Current Limit for Power Supply Regulators, Jun. 7, 1994.

*Primary Examiner*—Stuart N. Hecker
*Attorney, Agent, or Firm*—R. Louis Breeden

[57] ABSTRACT

A voltage regulator circuit (100) for coupling to a power supply voltage (BPLUS) generates and regulates an output voltage (VREG). The voltage regulator circuit (100) includes a gain control element (148) for controlling the loop gain of the voltage regulator circuit (100) in response to the output current. Under heavy load conditions, the gain control element (148) functions to reduce (716) the output voltage (VREG) and thus the output current of the voltage regulator circuit (100) to avoid an overload that would pull the power supply voltage (BPLUS) below a predetermined level.

11 Claims, 5 Drawing Sheets

VOLTAGE REGULATOR CIRCUIT HAVING ADAPTIVE LOOP GAIN

FIELD OF THE INVENTION

This invention relates in general to voltage regulator circuits, and more specifically to a voltage regulator circuit having an adaptive loop gain.

BACKGROUND OF THE INVENTION

It is well known in the art that a voltage regulator is basically a comparator that compares a voltage reference and a voltage proportional to an output voltage from the voltage regulator to develop an error signal. The error signal is amplified by a direct current (DC) amplifier and then used to drive the output voltage to a predetermined level, thereby forming a closed loop system. To maintain a precise voltage regulation throughout a normal range of load currents which the voltage regulator must supply during operation after power-up, very high loop gain is required.

Very high loop gain also results in a momentarily high current drain from the power source supplying power to the conventional voltage regulator whenever the load condition at the output of the voltage regulator exhibits a momentarily low impedance. Such a load condition can be exhibited, for example, immediately after power is applied to a capacitive load, which can cause a momentarily heavy inrush current to bring the capacitive load up to the regulated output voltage. Some electronic devices, e.g., battery powered communication receivers, utilize a voltage regulator for powering circuit elements that require a precisely regulated voltage level during normal device operation. Other circuit elements that can tolerate less precise voltage are preferably not powered from the voltage regulator, but are powered directly from the battery, for greatest economy and energy efficiency. Such other circuit elements can include, for example, a microprocessor and a memory element.

Some batteries unfortunately have relatively high internal impedance and thus are not able to supply a load current substantially higher than the normal range of load currents, even for a brief period. The voltage of such a battery can drop momentarily to a very low level when the battery is subjected to the high current drain from the power source supplying power to the conventional voltage regulator whenever the load condition exhibits a momentarily low impedance. When the battery voltage drops to the very low level, deleterious effects can occur in the circuit elements that are powered directly from the battery. For example, the microprocessor can reset, and the memory contents can be lost.

It would be possible to use a lower loop gain in the conventional voltage regulator to limit the battery current drain by allowing the regulated output voltage to drop out of regulation under heavy load conditions. Lower loop gain, however, would destroy the ability of the voltage regulator to maintain the desirable precise voltage regulation throughout the normal range of load currents which the voltage regulator must supply during normal operation.

Thus, what is needed is a voltage regulator that can maintain a precise voltage regulation throughout a normal range of load currents which the voltage regulator must supply during operation after power-up, without allowing a high current drain from the power source under momentary heavy load conditions, such as a power-up of a capacitive load.

SUMMARY OF THE INVENTION

One aspect of the present invention is a voltage regulator circuit for coupling to a power supply that provides a power supply voltage at first and second power supply nodes. The voltage regulator circuit generates and regulates an output voltage. The voltage regulator circuit comprises a comparator coupled to the first and second power supply nodes and coupled to a reference voltage and to a divider voltage proportional to the output voltage for comparing the reference voltage with the divider voltage to generate an error signal. The voltage regulator circuit further comprises an amplifier having a gain. The amplifier is coupled to the first and second power supply nodes and coupled to the comparator for amplifying the error signal to produce an amplified error signal. The voltage regulator circuit also includes an output element coupled to the first and second power supply nodes and coupled to the amplifier for generating and regulating the output voltage in response to the amplified error signal. In addition, the voltage regulator circuit includes an output current sampler coupled to the first and second power supply nodes and coupled to the output element for generating an output signal voltage responsive to an output current supplied by the output element. The voltage regulator circuit further comprises a gain control element coupled to the second power supply node and coupled to the output current sampler and to the amplifier for controlling the gain of the amplifier in response to the output signal voltage. The gain control element functions to reduce the output voltage and the output current to avoid an overload that could pull the power supply voltage below a predetermined level.

Another aspect of the present invention is a method in a voltage regulator circuit powered from a power supply having a power supply voltage. The method generates and regulates an output voltage supplied at an output of the voltage regulator. The method comprises the steps of comparing a reference voltage with a divider voltage proportional to the output voltage to generate an error signal, and amplifying the error signal by a gain to produce an amplified error signal. The method further comprises generating and regulating the output voltage in response to the amplified error signal, and generating an output signal voltage responsive to an output current flowing through the output. The method further comprises controlling the gain in response to the output signal voltage, including the step of reducing the output voltage and the output current to avoid an overload that could pull the power supply voltage below a predetermined level.

Another aspect of the present invention is a communication receiver comprising an antenna for intercepting a signal including information, and a receiver element coupled to the antenna for demodulating the signal to derive the information. The communication receiver further comprises a processor coupled to the receiver for processing the information, and a power supply providing a power supply voltage at first and second power supply nodes. The communication receiver further comprises a voltage regulator circuit coupled to first and second power supply nodes for generating and regulating an output voltage utilized within the communication receiver. The voltage regulator circuit comprises a comparator coupled to the first and second power supply nodes and coupled to a reference voltage and to a divider voltage proportional to the output voltage for comparing the reference voltage with the divider voltage to generate an error signal. The voltage regulator circuit further comprises an amplifier having a gain. The amplifier is coupled to the first and second power supply nodes and coupled to the comparator for amplifying the error signal to produce an amplified error signal. The voltage regulator circuit also includes an output element coupled to the first and second power supply nodes and coupled to the amplifier for generating and regulating the output voltage in response to the amplified error signal. In addition, the voltage regulator circuit includes an output current sampler coupled to the first and second power supply nodes and coupled to the output element for generating an output signal voltage responsive to an output current supplied by the output element. The voltage regulator circuit further comprises a gain controller coupled to the second power supply node and coupled to the output current sampler and to the amplifier for controlling the gain of the amplifier in response to the output signal voltage. The gain controller functions to reduce the output voltage and the output current to avoid an overload that could pull the power supply voltage below a predetermined level.

DESCRIPTION OF THE PREFERRED EMBODIMENT

Figure 1:
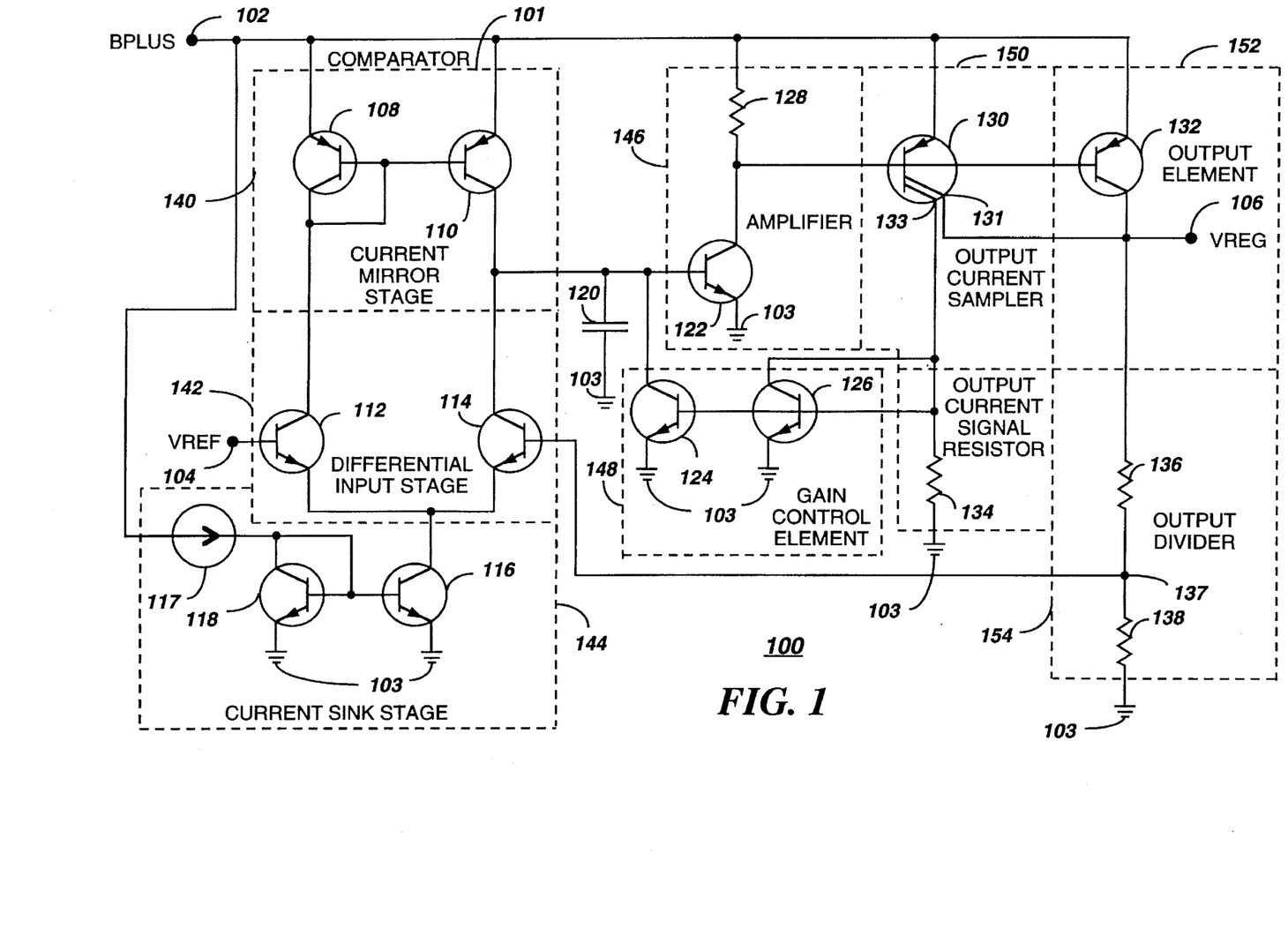
FIG. 1 is an electrical block diagram of a voltage regulator circuit in accordance with the preferred embodiment of the present invention.

Referring to FIG. 1, an electrical block diagram depicts a voltage regulator circuit 100 in accordance with the preferred embodiment of the present invention comprising a comparator 101 including a current mirror stage 140 for producing a large differential gain, and a differential input stage 142 coupled to the current mirror stage 140 for comparing a reference voltage and a divider voltage proportional to the output voltage of the voltage regulator circuit 100 to produce an error signal. The comparator 101 further comprises a current sink stage 144 coupled to the differential input stage 142 for setting a level of current through the current mirror stage 140 and through the differential input stage 142.

The current mirror stage 140 comprises PNP first and second transistors 108,110 having emitters connected to a first power supply node 102 for receiving a positive voltage (BPLUS). The first transistor 108 is diode-coupled, having its base connected to its collector, and the base of the second transistor 110 is coupled to the base of the first transistor 108 to mirror the current of the first transistor 108. The collectors of the first and second transistors 108,110 are connected to the collectors of corresponding NPN third and fourth transistors 112,114, respectively, that form the differential input stage 142.

The base of the third transistor 112 is connected to a voltage reference signal (VREF) at a voltage reference node 104 for determining the output voltage of the voltage regulator circuit 100. The base of the fourth transistor 114 is connected to a divider node 137 of an output divider 154 for receiving therefrom the divider voltage proportional to the output voltage of the voltage regulator circuit 100. The emitters of the third and fourth transistors 112,114 are connected to the collector of an NPN fifth transistor 116 of the current sink stage 144.

The current sink stage 144 also includes a current source 117 and an NPN sixth transistor 118. The sixth transistor 118 is diode coupled, having its collector connected to its base. The current source 117 also is connected to the collector of the sixth transistor 118. The emitters of the fifth and sixth transistors 116,118 are connected to a second power supply node 103 (circuit ground), and the bases thereof are connected together so that the current flowing in the fifth transistor 116 mirrors that of the sixth transistor 118. The value of the current flowing in the fifth and sixth transistors 116,118 is determined by the current source 117. The current source 117 is preferably a conventional 40 microamp bandgap current reference. It will be appreciated that other types of current sources and other current reference values can be utilized as well for the current source 117, depending upon specific operational requirements and parameters of the voltage regulator circuit 100.

The voltage regulator circuit 100 further comprises an amplifier 146 coupled to the current mirror stage 140 for amplifying the error signal, and an output element 152 coupled to the amplifier 146 for generating and regulating the output voltage in response to the amplified error signal. The amplifier comprises an NPN seventh transistor 122 whose base is connected to the collectors of the second and fourth transistors 110,114, and further connected through a capacitor 120 to the second power supply node 103 for preventing high frequency instability. The emitter of the seventh transistor 122 is connected to the second power supply node 103, while the collector thereof is connected through a resistor 128 to the first power supply node 102. Preferably the nominal value of the capacitor 120 is fifty picofarads, and the value of the resistor 128 is one hundred thousand ohms. It will be appreciated that other capacitance and resistance values can be utilized as well for the capacitor 120 and the resistor 128, depending upon specific operational requirements and parameters of the voltage regulator circuit 100.

The voltage regulator circuit 100 further comprises an output current sampler 150 coupled to the amplifier 146 and coupled to the output element 152 as a proportional current mirror for generating a sampler current proportional to the output current in accordance with the preferred embodiment of the present invention. The output current sampler 150 comprises a PNP eighth transistor 130 having first and second collectors 131,133. The output element 152 comprises a PNP ninth transistor 132. The emitters of the eighth and ninth transistors 130,132 are connected to the first power supply node 102, while the bases of the eighth and ninth transistors 130,132 are connected to the collector of the seventh transistor 122. The first collector 131 of the eighth transistor 130 is connected to the collector of the ninth transistor 132 at a regulated output node 106 for delivery of a regulated output voltage (VREG).

The relative geometry of the eighth and ninth transistors 130,132 is such that the second collector 133 of the eighth transistor 130 carries a current much smaller than, but substantially proportional to, the output current flowing in a load connected between the regulated output node 106 and the second power supply node 103. Preferably, the relative geometry is such that the current carried by the second collector 133 equals about one and one-quarter percent of the output current. The second collector 133 of the eighth transistor 130 is connected through an output current signal resistor 134 to the second power supply node for generating an output signal voltage proportional to the output current. The value of the resistor 134 is preferably fourteen thousand ohms. It will be appreciated that other resistance values and relative geometry can be utilized as well for the resistor 134, and the eighth and ninth transistors 130,132, depending upon specific operational requirements and parameters of the voltage regulator circuit 100.

The voltage regulator circuit 100 further comprises the output divider 154 including resistors 136,138 coupled, respectively, between the regulated output node 106 and the divider node 137, and between the divider node 137 and the second power supply node 103 for dividing the output voltage to generate the divider voltage proportional to the output voltage of the voltage regulator circuit 100 at the divider node 137. The preferable values of the resistors 136,138, respectively, are thirty-thousand ohms and one-hundred-seventy-thousand ohms. It will be appreciated that other resistance values can be utilized as well for the resistors 136,138, depending upon specific operational requirements and parameters of the voltage regulator circuit 100.

In addition, the voltage regulator circuit 100 includes a gain control element 148 coupled to the second collector 133 of the eighth transistor 130, and coupled to the output current signal resistor 134, and further coupled to the amplifier 146 for controlling the gain of the amplifier 146 in response to the output current signal, in accordance with the preferred embodiment of the present invention. The gain control element comprises NPN tenth and eleventh transistors 126,124 having emitters connected to the second power supply node 103. The tenth transistor 126 is diode-coupled, having its base connected to its collector, and the base of the eleventh transistor 124 is coupled to the base of the tenth transistor 126 to mirror the current of the tenth transistor 126. The collector of the eleventh transistor 124 is connected to the base of the seventh transistor 122 of the amplifier 146.

During operation, when the voltage regulator circuit 100 is delivering a normal range of load currents, the comparator 101, the amplifier 146, the output element 152, and the output divider 154 operate to provide a regulated output voltage at the regulated output node 106. While delivering the normal range of load currents, the current from the second collector 133 of the output current sampler 150 is small and generates a correspondingly small output signal voltage across the output current signal resistor 134. The voltage generated is small enough that current flow in the gain control element 148 is negligible, and thus produces a negligible effect on the loop gain of the voltage regulator circuit 100.

Under unusually heavy load conditions, however, the current from the second collector 133 of the output current sampler 150 becomes large enough to generate a correspondingly large output signal voltage across the output current signal resistor 134, the voltage being large enough to cause a significant current flow in the gain control element 148. A large current flow in the gain control element 148 "robs" base current from the amplifier 146, thus significantly reducing the loop gain of the voltage regulator circuit 100, and thereby allowing the voltage at the regulated output node 106 to fall out of regulation and reduce the output current.

When the unusually heavy load conditions subside, the current from the second collector 133 of the output current sampler 150 returns to a small level and generates a correspondingly small output signal voltage across the output current signal resistor 134. The voltage generated is again small enough to cause a negligible current flow in the gain control element 148. Under this condition, the full loop gain of the voltage regulator circuit 100 is restored, and the voltage regulator circuit 100 maintains a precise voltage regulation throughout the normal range of load currents which the voltage regulator must supply during normal operation.

Thus, the present invention advantageously provides a voltage regulator that can maintain a precise voltage regulation throughout a normal range of load currents which the voltage regulator must supply during operation, without allowing a high current drain from the power source under unusually heavy load conditions, such as a power-up of a capacitive load.

In order to achieve a maximally predictable relationship among the components thereof, the voltage regulator circuit 100 is preferably fabricated as an integrated circuit. When fabricated as an integrated circuit, the current mirror transistors utilized throughout the voltage regulator circuit 100 can be expected to be closely matched, thereby producing highly predictable results. It will be appreciated that the voltage regulator circuit 100 can be constructed from discrete devices, but at a price of somewhat greater variation in performance from one unit to another.

It also will be appreciated by one of ordinary skill in the art that the polarity of the voltage regulator circuit 100 in accordance with the preferred embodiment can be reversed without departing from the intent of the present invention. That is, the first power supply node can be changed from a positive voltage to a negative voltage, the PNP transistors changed to NPN transistors, and vice versa, and the direction of the capacitive element 120 reversed. It will be further appreciated that other similar components can be substituted as well for the transistors, resistors, and the capacitive element utilized in the voltage regulator circuit 100.

Figure 2:
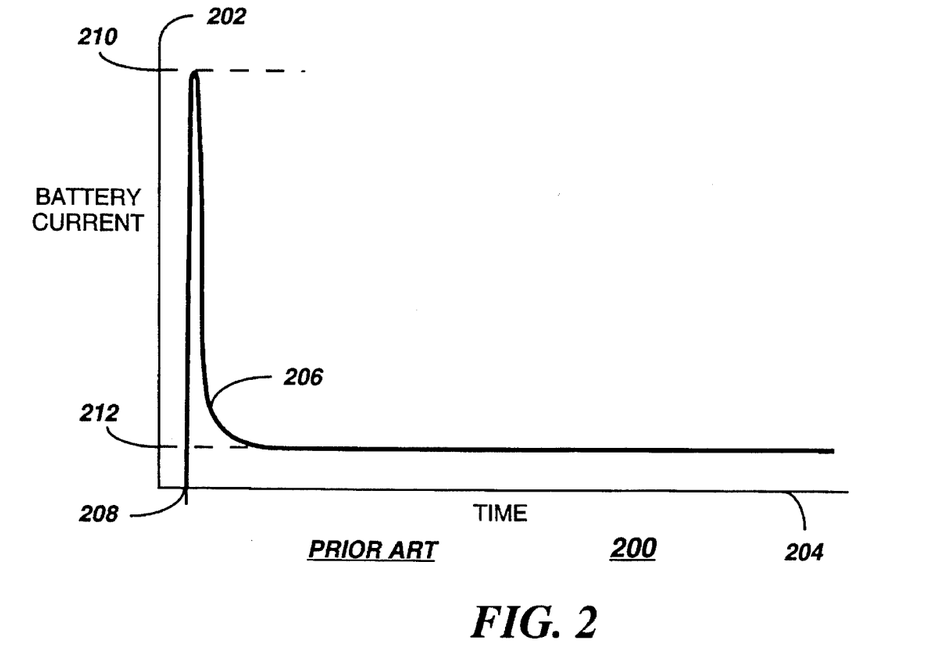
FIG. 2 is a diagram depicting high inrush current during a power-up of a capacitive load coupled to a prior art voltage regulator circuit.

Referring to FIG. 2, a diagram 200 depicts a high inrush current during a power-up of a capacitive load coupled to a prior art voltage regulator circuit operating from a battery power source. The vertical scale 202 indicates battery current required, while the horizontal scale 204 indicates time. The time at which the power-up begins is depicted by the time mark 208. A current response graph 206 demonstrates that the battery current rises quickly after the power-up to a high peak level 210 and then returns quickly to a steady state level 212. Such momentarily high power supply current demands can produce very low battery voltage having deleterious effects on circuit elements powered directly from the battery.

Figure 3:
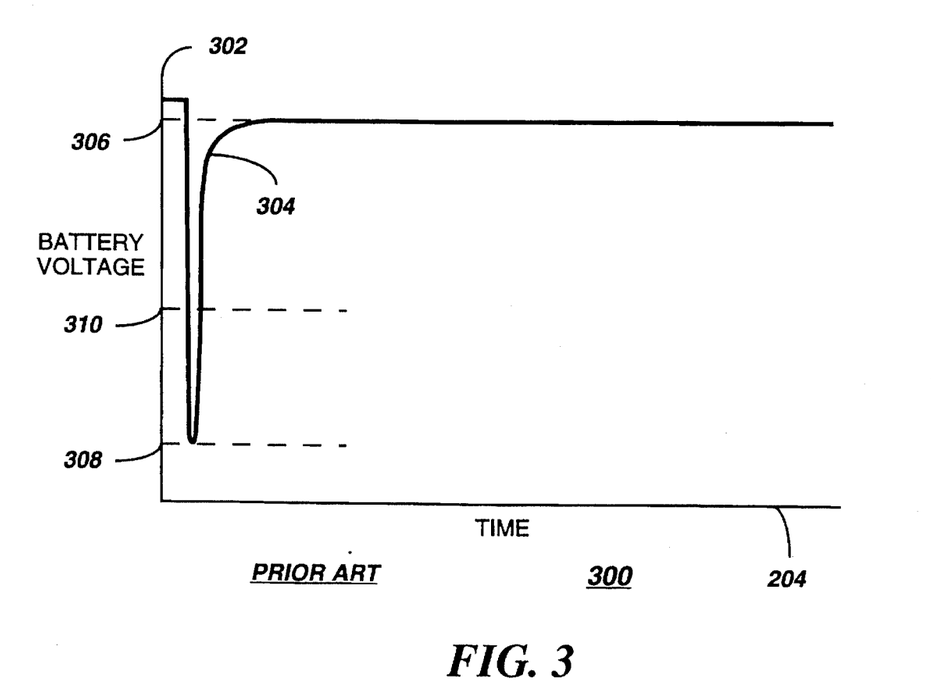
FIG. 3 is a diagram depicting battery voltage during the power-up of a capacitive load coupled to a prior art voltage regulator circuit.

Referring to FIG. 3, a diagram depicts battery voltage during the power-up of a capacitive load coupled to a prior art voltage regulator circuit. The vertical scale 302 indicates battery voltage, while time is indicated by the horizontal scale 204, the same as in FIG. 2. A voltage response graph 304 demonstrates that after the power-up the battery voltage momentarily falls to a very low voltage level 308 in response to the high battery current, and then returns to a steady state voltage level 306. The very low voltage level 308 is considerably lower than a voltage level 310 required to maintain proper operation of circuit elements directly powered from the battery, such as a microprocessor and memory.

Figure 4:
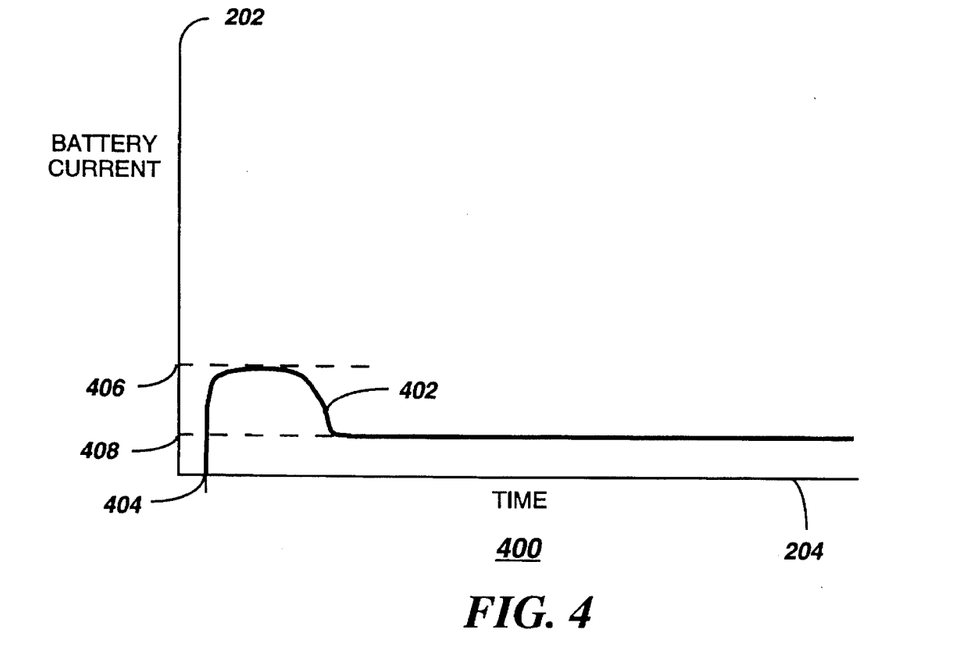
FIG. 4 is a diagram depicting reduced inrush current during the power-up of a capacitive load coupled to a voltage regulator circuit in accordance with the preferred embodiment of the present invention.

Referring to FIG. 4, a diagram 400 depicts an advantageously reduced inrush current during the power-up of the capacitive load coupled to the voltage regulator circuit 100 in accordance with the preferred embodiment of the present invention. The scales 202, 204 of the diagram 400 are the same as the scales 202,204 of the diagram 200. The time at which the power-up begins is depicted by the time mark 404. A response graph 402 demonstrates that after the power-up the battery current rises quickly to a reduced peak current level 406 with respect to the high peak level 210 of the prior art, at which point the gain control element 148 limits the loop gain of the voltage regulator circuit 100 in accordance with the present invention to prevent the battery current from rising higher. The reduced peak current level 406 advantageously minimizes the potential for deleterious effects on circuit elements that are powered directly from the battery.

Figure 5:
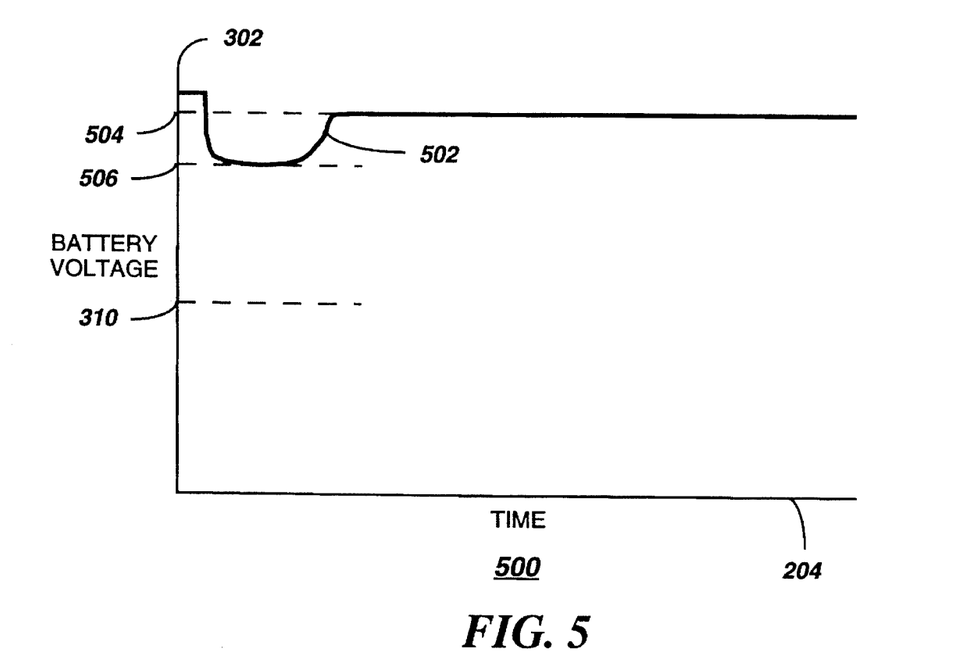
FIG. 5 is a diagram depicting battery voltage during the power-up of a capacitive load coupled to a voltage regulator circuit in accordance with the preferred embodiment of the present invention.

Referring to FIG. 5, a diagram depicts battery voltage during the power-up of a capacitive load coupled to a voltage regulator circuit in accordance with the preferred embodiment of the present invention. The scales 302,204 of the diagram 500 are the same as the scales 302,204 of the diagram 300. A voltage response graph 502 demonstrates that after the power-up the battery voltage momentarily falls to a moderate voltage level 506 with respect to the very low voltage level 308 of the prior art, in response to the much lower peak battery current, and then returns more slowly to a steady state voltage level 504. The moderate voltage level 506 is advantageously well above the voltage level 310 required to maintain proper operation of the circuit elements directly powered from the battery.

Thus, the present invention advantageously overcomes the problems associated with conventional voltage regulators when powered from batteries having high internal impedance. By reducing the loop gain of the voltage regulator as required to accommodate momentarily low load impedance, the preferred embodiment of the present invention prevents the battery voltage from dropping low enough to cause any deleterious effects. When the load impedance returns to the normal operating range, full loop gain is restored so that the voltage regulator provides precise regulation of the output voltage.

Figure 6:
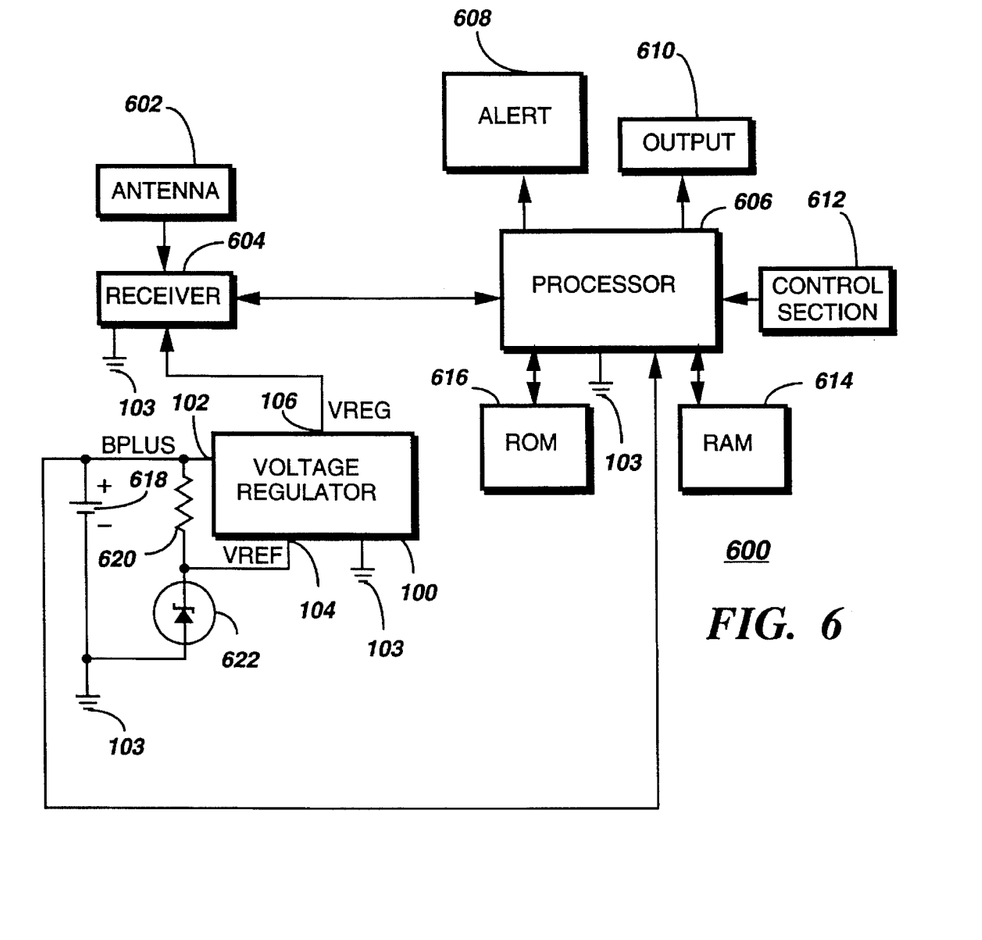
FIG. 6 is an electrical block diagram of a communication receiver in accordance with the preferred embodiment of the present invention.

Referring to FIG. 6, an electrical block diagram depicts a communication receiver 600 in accordance with the preferred embodiment of the present invention comprising a conventional antenna 602 for intercepting communication signals including information. A receiver element 604 is coupled to the antenna 602 for demodulating the communication signals to derive the information. The receiver element 604 is preferably similar to the receiver element of the model A03KLB5962CA ADVISOR® pager, manufactured by Motorola, Inc. of Schaumburg, Ill. A processor 606 is coupled to the receiver element for processing the information. Preferably, the processor 606 is similar to the MC68HC05, C08, or C11 series microcomputer manufactured by Motorola, Inc. of Schaumburg, Ill. An alert element 608, e.g., a conventional piezoelectric transducer, is coupled to the processor 606 for generating an alert responsive to the information. An output device, e.g., a well-known liquid crystal display or a speaker, is coupled to the processor 606 for visibly or audibly reproducing the information. A control section 612, comprising well-known knobs, switches, and buttons, is coupled to the processor 606 for allowing a user to control the communication receiver 600. A conventional random access memory (RAM) 614 is coupled to the processor 606 for storing the information received. A conventional read-only memory (ROM) 616 is also coupled to the processor 606 for storing operating software and other necessary parameters.

It will be appreciated that other types of ROM, e.g., electrically erasable programmable ROM (EEPROM) and electrically alterable ROM (EAROM), can be utilized as well for the ROM 616, and further that the processor 606, the ROM 616, and the RAM 614 can be fabricated as a contiguous integrated circuit in alternative embodiments in accordance with the present invention.

The communication receiver 600 further comprises the voltage regulator circuit 100 in accordance with the preferred embodiment of the present invention. A conventional battery 618 is connected to the voltage regulator circuit 100 at the first and second power supply nodes 102,103, and is coupled to the processor 606 for providing unregulated battery voltage thereto. A resistor 620 is connected between the first power supply node 102 and the voltage reference node 104. A conventional voltage reference device 622, preferably a conventional band-gap voltage reference, is connected between the voltage reference node 104 and the second power supply node 103 for providing the Voltage reference at the voltage reference node 104. The regulated output node 106 is coupled to the receiver element 604 for providing a regulated voltage thereto. It will be appreciated that other types of voltage references, such as a zener diode, may be used as well for the voltage reference device 622, depending upon specific operational requirements and parameters of the voltage regulator circuit 100.

Figure 7:
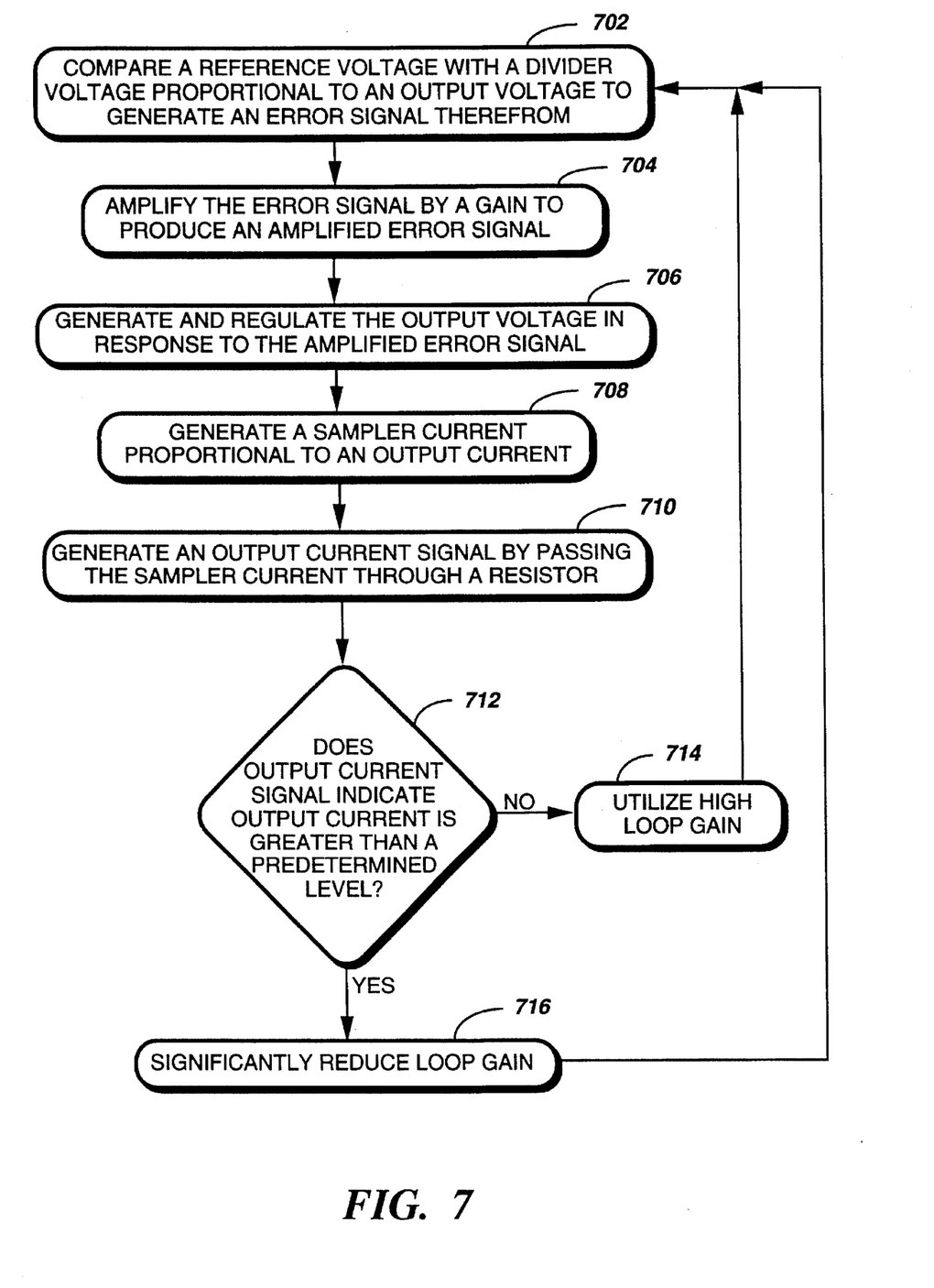
FIG. 7 is a flow chart of a method for generating and regulating an output voltage in accordance with the preferred embodiment of the present invention.

Referring to FIG. 7, a flow chart depicts a method for generating and regulating an output voltage in accordance with the preferred embodiment of the present invention. In step 702 the comparator 101 compares the reference voltage at the voltage reference node 104 with the divider voltage from the divider node 137 to generate an error signal therefrom. The amplifier 146 then amplifies 704 the error signal by a gain to produce an amplified error signal. The output element 152 generates and regulates 706 the output voltage at the regulated output node 106 in response to the amplified error signal.

At the same time, the output current sampler 150 generates 708 a sampler current proportional to the output current passing from the regulated output node 106 into a load connected thereto. The sampler current is passed through the output current signal resistor 134 to generate 710 an output signal voltage. In step 712 the gain control element 148 tests the output signal voltage to determine whether the voltage is greater than the turn-on voltage of the diode coupled transistor 126. If not, the gain control element 148 produces negligible effect on the amplifier 146, allowing 714 the utilization of high loop gain by the voltage regulator circuit 100.

If, on the other hand, in step 712 the gain control element 148 determines that the output signal voltage is greater than the turn-on voltage of the diode coupled transistor 126, then the gain control circuit 148 operates to significantly reduce 716 the loop gain of the voltage regulator circuit 100 by sinking current away from the amplifier 146. The reduction in loop gain limits the load current and thus also limits the current drawn from the battery 618, thereby advantageously preventing the battery voltage from falling low enough to cause deleterious effects on other circuit elements powered directly from the battery.

Thus, it should be clear from the preceding that the present invention advantageously provides a method and apparatus in a voltage regulator circuit for maintaining a precise voltage regulation throughout a normal range of load currents which the voltage regulator must supply during operation after power-up. The method and apparatus further prevent a high current drain from the power source under momentary heavy load conditions, such as a power-up of a capacitive load, which if not prevented could produce deleterious effects on elements powered directly from the power source.

What is claimed is:

1. A voltage regulator circuit for coupling to a power supply that provides a power supply voltage at first and second power supply nodes, the voltage regulator circuit further for generating and regulating an output voltage, the voltage regulator circuit comprising:

comparator means coupled to the first and second power supply nodes and coupled to a reference voltage and to a divider voltage proportional to the output voltage for comparing the reference voltage with the divider voltage to generate an error signal;

amplifier means having a gain, the amplifier means coupled to the first and second power supply nodes and coupled to the comparator means for amplifying the error signal to produce an amplified error signal;

output means coupled to the first and second power supply nodes and coupled to the amplifier means for generating and regulating the output voltage in response to the amplified error signal;

output current sampler means coupled to the first and second power supply nodes and coupled to the output means for generating an output signal voltage responsive to an output current supplied by the output means; and gain control means coupled to the second power supply node and coupled to the output current sampler means and to the amplifier means for controlling the gain of the amplifier means in response to the output signal voltage, wherein the gain control means functions to reduce the output voltage and the output current to avoid an overload that would pull the power supply voltage below a predetermined level.

2. The voltage regulator circuit of claim 1, wherein the output current sampler means comprises:

a current sampler transistor having a base, an emitter, and first and second collectors, the base, emitter, and first collector coupled to the output means as a first current mirror for generating a sampler current from the second collector, the sampler current proportional to the output current; and a resistor coupled between the second collector and the second power supply node for generating the output signal voltage at the second collector in response to the sampler current.

3. The voltage regulator circuit of claim 2, wherein the gain control means comprises a second current mirror coupled to the second collector of the current sampler transistor for receiving the output signal voltage, and wherein the second current mirror cooperates with the output signal voltage to produce a negligible effect on the gain of the amplifier means when the output current is below a predetermined level, and to significantly reduce the gain of the amplifier means by limiting a current to the amplifier means when the output current is above the predetermined level.

4. The voltage regulator circuit of claim 3, wherein the comparator means comprises:

a current mirror stage coupled to the first power supply node and coupled to first and second intermediate nodes;

a current sink stage coupled between a third intermediate node and the second power supply node for setting a level of current through the current mirror stage and through a differential input stage; and the differential input stage coupled between the third intermediate node and the first and second intermediate nodes for receiving the reference voltage and the divider voltage, and wherein the error signal is generated at one of the first and second intermediate nodes.

5. A method in a voltage regulator circuit powered from a power supply having a power supply voltage, the method for generating and regulating an output voltage supplied at an output of the voltage regulator, the method comprising the steps of:

comparing a reference voltage with a divider voltage proportional to the output voltage to generate an error signal;

amplifying the error signal by a gain to produce an amplified error signal;

generating and regulating the output voltage in response to the amplified error signal;

generating an output signal voltage responsive to an output current flowing through the output; and controlling the gain in response to the output signal voltage, comprising the step of reducing the output voltage and the output current to avoid an overload that would pull the power supply voltage below a predetermined level.

6. The method of claim 5, wherein the step of generating an output signal voltage comprises the steps of:

generating a sampler current proportional to the output current; and generating the output signal voltage by passing the sampler current through a resistor.

7. The method of claim 6, wherein the controlling step comprises the steps of:

producing a negligible effect on the gain when the output current is below a predetermined level; and significantly reducing the gain when the output current is above the predetermined level.

8. A communication receiver, comprising:

an antenna for intercepting a signal including information;

a receiver element coupled to the antenna for demodulating the signal to derive the information;

a processor coupled to the receiver for processing the information;

a power supply providing a power supply voltage at first and second power supply nodes; and a voltage regulator circuit coupled to first and second power supply nodes for generating and regulating an output voltage utilized within the communication receiver, the voltage regulator circuit comprising:

a comparator coupled to the first and second power supply nodes and coupled to a reference voltage and to a divider voltage proportional to the output voltage for comparing the reference voltage with the divider voltage to generate an error signal;

an amplifier having a gain, the amplifier coupled to the first and second power supply nodes and coupled to the comparator for amplifying the error signal to produce an amplified error signal;

an output element coupled to the first and second power supply nodes and coupled to the amplifier for generating and regulating the output voltage in response to the amplified error signal;

an out-put current sampler coupled to the first and second power supply nodes and coupled to the output element for generating an output signal voltage responsive to an output current supplied by the output element; and a gain controller coupled to the second power supply node and coupled to the output current sampler and to the amplifier for controlling the gain of the amplifier in response to the output signal voltage, wherein the gain controller functions to reduce the output voltage and the output current to avoid an overload that would pull the power supply voltage below a predetermined level.

9. The communication receiver of claim 8, wherein the output current sampler comprises:

a current sampler transistor having a base, an emitter, and first and second collectors, the base, emitter, and first collector coupled to the output element as a first current mirror for generating a sampler current from the second collector, the sampler current proportional to the output current; and a resistor coupled between the second collector and the second power supply node for generating the output signal voltage at the second collector in response to the sampler current.

10. The communication receiver of claim 9, wherein the gain controller comprises a second current mirror coupled to the second collector of the current sampler transistor for receiving the output signal voltage, and wherein the second current mirror cooperates with the output signal voltage to produce a negligible effect on the gain of the amplifier when the output current is below a predetermined level, and to significantly reduce the gain of the amplifier by limiting a current to the amplifier when the output current is above the predetermined level.

11. The communication receiver of claim 10, wherein the comparator comprises:

a current mirror stage coupled to the first power supply node and coupled to first and-second intermediate nodes;

a current sink stage coupled between a third intermediate node and the second power supply node for setting a level of current through the current mirror stage and through a differential input stage; and the differential input stage coupled between the third intermediate node and the first and second intermediate nodes for receiving the reference voltage and the divider voltage, and wherein the error signal is generated at one of the first and second intermediate nodes.

* * * * *